US011956751B2

(12) United States Patent
Marez

(10) Patent No.: US 11,956,751 B2
(45) Date of Patent: Apr. 9, 2024

(54) SYSTEM AND METHOD FOR GENERATING AMORPHOUS DYNAMIC DISPLAY ICONS

(71) Applicant: Glowstik, Inc., Denver, CO (US)

(72) Inventor: Adam Montoya Marez, Denver, CO (US)

(73) Assignee: Glowstik, Inc., Denver, CO (US)

( * ) Notice: Subject to any disclaimer, the term of this patent is extended or adjusted under 35 U.S.C. 154(b) by 0 days.

(21) Appl. No.: 17/746,160

(22) Filed: May 17, 2022

(65) Prior Publication Data

US 2022/0279474 A1 Sep. 1, 2022

Related U.S. Application Data

(63) Continuation of application No. 17/039,959, filed on Sep. 30, 2020, now Pat. No. 11,337,177.

(60) Provisional application No. 63/082,361, filed on Sep. 23, 2020.

(51) Int. Cl.
*H04W 64/00* (2009.01)
*G06N 3/043* (2023.01)
*H04W 4/021* (2018.01)

(52) U.S. Cl.
CPC .......... *H04W 64/003* (2013.01); *G06N 3/043* (2023.01); *H04W 4/021* (2013.01)

(58) Field of Classification Search
CPC .. H04W 64/003; H04W 4/021; G06N 3/0436; G06N 7/00
See application file for complete search history.

(56) References Cited

U.S. PATENT DOCUMENTS

| | | | |
|---|---|---|---|
| 5,918,159 A | 6/1999 | Fomukong |
| 6,317,604 B1 | 11/2001 | Kovach, Jr. |
| 6,360,102 B1 | 3/2002 | Havinis |
| 6,456,234 B1 | 9/2002 | Johnson |
| 6,463,288 B1 | 10/2002 | Havinis |
| 6,505,048 B1 | 1/2003 | Moles |
| 6,560,461 B1 | 5/2003 | Fomukong |
| 6,662,014 B1 | 12/2003 | Walsh |
| 6,731,238 B2 | 5/2004 | Johnson |

(Continued)

FOREIGN PATENT DOCUMENTS

| | | |
|---|---|---|
| CN | 108090144 | 5/2018 |
| WO | 2014150847 | 9/2014 |

(Continued)

OTHER PUBLICATIONS

PCT International Search Report and Written Opinion of the International Searching Authority, PCT/US2021/051649, dated Oct. 14, 2021.

*Primary Examiner* — Kabir A Timory
(74) *Attorney, Agent, or Firm* — Jonathan Spangler; Jay Bell

(57) ABSTRACT

A system and method for generating amorphous randomized and/or fuzzy logic dynamic display icons that visually communicate to its users and/or entities that a subject's geographic location is being obfuscated on a graphical mapping interface of the user's computing device by way of continuously generating a dynamic location display icon having amorphous and/or asymmetrical shape, size, position, color, opacity, outline, movement, and/or transformation rate, and displaying the generated dynamic display icon on the graphical mapping interface.

18 Claims, 5 Drawing Sheets

(56) References Cited

U.S. PATENT DOCUMENTS

| | | |
|---|---|---|
| 6,738,808 B1 | 5/2004 | Zellner |
| 6,975,329 B2 | 12/2005 | Bastos |
| 6,999,437 B2 | 2/2006 | Krishnamurthi |
| 7,023,995 B2 | 4/2006 | Olsson |
| 7,054,648 B2 | 5/2006 | Abtin |
| 7,069,319 B2 | 6/2006 | Zellner |
| 7,185,204 B2 | 2/2007 | Narayanaswami |
| 7,187,997 B2 | 3/2007 | Johnson |
| 7,209,491 B2 | 4/2007 | Zheng |
| 7,293,172 B2 | 11/2007 | Nishimura |
| 7,349,377 B2 | 3/2008 | Le |
| 7,353,034 B2 | 4/2008 | Haney |
| 7,403,785 B2 | 7/2008 | Daniels |
| 7,406,322 B2 | 7/2008 | McMahan |
| 7,418,503 B2 | 8/2008 | Zellner |
| 7,426,746 B2 | 9/2008 | Mononen |
| 7,428,522 B1 | 9/2008 | Raghunathan |
| 7,512,405 B2 | 3/2009 | Walsh |
| 7,522,996 B2 | 4/2009 | Jung |
| 7,543,045 B1 | 6/2009 | Agrawal |
| 7,603,114 B2 | 10/2009 | Carlson |
| 7,616,220 B2 | 11/2009 | Baxter |
| 7,627,331 B2 | 12/2009 | Winterbottom |
| 7,643,836 B2 | 1/2010 | McMahan |
| 7,818,412 B2 | 10/2010 | Krause |
| 7,860,648 B2 | 12/2010 | Jung |
| 7,869,814 B2 | 1/2011 | Winterbottom |
| 7,890,122 B2 | 2/2011 | Walsh |
| 7,966,020 B2 | 6/2011 | Drennan |
| 7,992,195 B2 | 8/2011 | Pfitzmann |
| 8,001,607 B2 | 8/2011 | Stull |
| 8,023,967 B2 | 9/2011 | Daniels |
| 8,041,817 B2 | 10/2011 | Zellner |
| 8,050,690 B2 | 11/2011 | Neeraj |
| 8,060,109 B2 | 11/2011 | Fomukong |
| 8,060,389 B2 | 11/2011 | Johnson |
| 8,099,088 B2 | 1/2012 | Carlson |
| 8,099,380 B1 | 1/2012 | Shahabi |
| 8,150,868 B2 | 4/2012 | Richardson |
| 8,180,326 B2 | 5/2012 | Hahn |
| 8,195,188 B2 | 6/2012 | Fomukong |
| 8,214,910 B1 | 7/2012 | Gossweiler |
| 8,259,649 B2 | 9/2012 | Weniger |
| 8,275,359 B2 | 9/2012 | Drennan |
| 8,315,599 B2 | 11/2012 | Kasad |
| 8,315,649 B1 | 11/2012 | McClendon |
| 8,332,535 B2 | 12/2012 | Dingier |
| 8,340,685 B2 | 12/2012 | Cochran |
| 8,392,114 B2 | 3/2013 | Jung |
| 8,402,117 B2 | 3/2013 | Zellner |
| 8,403,755 B2 | 3/2013 | Kerr |
| 8,473,729 B2 | 6/2013 | Trethewey |
| 8,494,489 B2 | 7/2013 | Drennan |
| 8,514,777 B1 | 8/2013 | Zhao |
| 8,538,458 B2 | 9/2013 | Haney |
| 8,559,927 B2 | 10/2013 | Kim |
| 8,582,827 B2 | 11/2013 | Jung |
| 8,612,767 B2 | 12/2013 | Gossweiler |
| 8,645,505 B2 | 2/2014 | Zellner |
| 8,655,389 B1 | 2/2014 | Arunkumar |
| 8,666,408 B2 | 3/2014 | Hahn |
| 8,676,198 B2 | 3/2014 | Hahn |
| 8,719,393 B2 | 5/2014 | Krause |
| 8,724,553 B2 | 5/2014 | Weniger |
| 8,738,903 B2 | 5/2014 | Hahn |
| 8,768,610 B2 | 7/2014 | Jung |
| 8,798,645 B2 | 8/2014 | Haney |
| 8,805,027 B2 | 8/2014 | Jung |
| 8,831,371 B2 | 9/2014 | Intwala |
| 8,831,572 B2 | 9/2014 | Drennan |
| 8,831,635 B2 | 9/2014 | Haney |
| 8,856,939 B2 | 10/2014 | Cai |
| 8,897,817 B1 | 11/2014 | Jackson |
| 8,909,250 B1 | 12/2014 | Wang |
| 8,910,308 B2 | 12/2014 | Dorfman |
| 8,914,859 B2 | 12/2014 | Erickson |
| 8,929,854 B2 | 1/2015 | Ung |
| 8,930,233 B2 | 1/2015 | Johnson |
| 8,942,995 B1 | 1/2015 | Kerr |
| 8,948,512 B2 | 2/2015 | Zuczek |
| 8,954,090 B2 | 2/2015 | Cochran |
| 8,966,114 B2 | 2/2015 | Dingier |
| 8,989,778 B2 | 3/2015 | Altman |
| 9,003,551 B2 | 4/2015 | Hoyer |
| 9,014,714 B2 | 4/2015 | Hahn |
| 9,041,711 B1 | 5/2015 | Hsu |
| 9,043,927 B2 | 5/2015 | Hu |
| 9,071,579 B1 | 6/2015 | Bender |
| 9,076,009 B2 | 7/2015 | Sathish |
| 9,117,088 B2 | 8/2015 | Faaborg |
| 9,117,094 B2 | 8/2015 | Anckaert |
| 9,119,055 B2 | 8/2015 | Vaccari |
| 9,122,693 B2 | 9/2015 | Blom |
| 9,131,167 B2 | 9/2015 | Regli |
| 9,135,452 B2 | 9/2015 | Gkoulalas-Divanis |
| 9,137,635 B2 | 9/2015 | Drennan |
| 9,161,165 B2 | 10/2015 | Wang |
| 9,179,304 B2 | 11/2015 | Zelinka |
| 9,214,033 B2 | 12/2015 | Jung |
| 9,230,306 B2 | 1/2016 | Sun |
| 9,239,935 B2 | 1/2016 | Cai |
| 9,286,729 B2 | 3/2016 | Jung |
| 9,294,874 B2 | 3/2016 | Drennan |
| 9,319,876 B2 | 4/2016 | Arunkumar |
| 9,342,206 B1 | 5/2016 | Andres |
| 9,351,116 B2 | 5/2016 | Xu |
| 9,405,391 B1 | 8/2016 | Mackraz |
| 9,411,967 B2 | 8/2016 | Parecki |
| 9,426,776 B2 | 8/2016 | Bellamkonda |
| 9,432,843 B2 | 8/2016 | Arunkumar |
| 9,436,180 B1 | 9/2016 | Fredinburg |
| 9,443,094 B2 | 9/2016 | Faaborg |
| 9,444,797 B2 | 9/2016 | Kurabayashi |
| 9,466,113 B2 | 10/2016 | Pham |
| 9,467,832 B2 | 10/2016 | Haney |
| 9,473,888 B1 | 10/2016 | Agarwal |
| 9,473,894 B2 | 10/2016 | Wang |
| 9,491,616 B2 | 11/2016 | Zelinka |
| 9,501,634 B2 | 11/2016 | Pfitzmann |
| 9,554,249 B2 | 1/2017 | Bai |
| 9,560,479 B2 | 1/2017 | Altman |
| 9,571,958 B2 | 2/2017 | Zellner |
| 9,576,151 B2 | 2/2017 | Dubov |
| 9,576,152 B2 | 2/2017 | Dubov |
| 9,578,025 B2 | 2/2017 | Pinski |
| 9,582,589 B2 | 2/2017 | St. Clair |
| 9,585,007 B2 | 2/2017 | Krause |
| 9,585,009 B2 | 2/2017 | Ta |
| 9,585,011 B2 | 2/2017 | Arunkumar |
| 9,599,486 B2 | 3/2017 | Jung |
| 9,602,964 B1 | 3/2017 | Agarwal |
| 9,613,363 B2 | 4/2017 | Cochran |
| 9,615,216 B2 | 4/2017 | Agarwal |
| 9,622,043 B2 | 4/2017 | Agarwal |
| 9,635,547 B1 | 4/2017 | Mincher |
| 9,736,685 B2 | 4/2017 | Cai |
| 9,674,649 B2 | 6/2017 | Vanderveen |
| 9,697,636 B2 | 7/2017 | Hider |
| 9,702,713 B2 | 7/2017 | Jung |
| 9,754,491 B2 | 9/2017 | Del Vecchio |
| 9,754,492 B2 | 9/2017 | Del Vecchio |
| 9,756,460 B2 | 9/2017 | Zhu |
| 9,760,298 B2 | 9/2017 | Andrews |
| 9,794,373 B1 | 10/2017 | Steinmetz |
| 9,797,737 B2 | 10/2017 | Jung |
| 9,805,217 B2 | 10/2017 | Zelinka |
| 9,807,604 B2 | 10/2017 | Pan |
| 9,824,475 B2 | 11/2017 | Stewart |
| 9,832,633 B2 | 11/2017 | Gerber |
| 9,836,613 B2 | 12/2017 | Edge |
| 9,867,041 B2 | 1/2018 | Xiong |
| 9,996,855 B2 | 1/2018 | Cochran |
| 9,906,900 B2 | 2/2018 | Cardno |
| 9,934,386 B2 | 4/2018 | Trethewey |

(56) References Cited

U.S. PATENT DOCUMENTS

| | | |
|---|---|---|
| 9,955,298 B1 | 4/2018 | Haney |
| 9,955,346 B2 | 4/2018 | Bohli |
| 9,965,892 B2 | 5/2018 | Clarberg |
| 9,967,714 B2 | 5/2018 | Ching |
| 9,992,169 B2 | 6/2018 | Bosnic |
| 10,003,957 B2 | 6/2018 | Hahn |
| 10,007,941 B1 | 6/2018 | Liu |
| 10,028,101 B2 | 7/2018 | Deng |
| 10,034,135 B1 | 7/2018 | Provost |
| 10,038,712 B2 | 7/2018 | Nathan |
| 10,042,035 B2 | 8/2018 | Grosman |
| 10,084,817 B2 | 9/2018 | Saher |
| 10,091,646 B2 | 10/2018 | Huang |
| 10,104,534 B2 | 10/2018 | Gerber |
| 10,121,014 B2 | 11/2018 | Edge |
| 10,129,366 B2 | 11/2018 | Agarwal |
| 10,134,342 B2 | 11/2018 | Aiden |
| 10,149,100 B2 | 12/2018 | Zhang |
| 10,163,403 B2 | 12/2018 | Aiden |
| 10,169,610 B2 | 1/2019 | Dubov |
| 10,244,388 B2 | 3/2019 | Ding |
| 10,229,071 B2 | 5/2019 | Haney |
| 10,305,929 B2 | 5/2019 | Kulkarni |
| 10,341,858 B1 | 7/2019 | Pawar |
| 10,373,389 B2 | 8/2019 | Jung |
| 10,380,643 B2 | 8/2019 | Cochran |
| 10,382,450 B2 | 8/2019 | Stephens |
| 10,387,677 B2 | 8/2019 | Chakraborty |
| 10,419,399 B2 | 9/2019 | Bender |
| 10,425,396 B2 | 9/2019 | Pfitzmann |
| 10,433,101 B2 | 10/2019 | Cardno |
| 10,467,661 B2 | 11/2019 | Papakipos |
| 10,482,583 B1 | 11/2019 | Suszek |
| 10,484,350 B2 | 11/2019 | Kanza |
| 10,499,190 B1 | 12/2019 | Douglas, Jr. |
| 10,528,762 B2 | 1/2020 | Chakraborty |
| 10,531,287 B2 | 1/2020 | Chakraborty |
| 10,542,424 B2 | 1/2020 | Chakraborty |
| 10,547,970 B1 | 1/2020 | Zheng |
| 10,592,690 B2 | 3/2020 | Kou |
| 10,599,289 B1 | 3/2020 | Voss |
| 10,609,554 B2 | 3/2020 | Milton |
| 10,631,128 B1 | 4/2020 | Douglas, Jr. |
| 10,659,491 B2 | 5/2020 | Nathan |
| 10,671,413 B2 | 6/2020 | St. Clair |
| 10,713,687 B2 | 7/2020 | Cochran |
| 10,743,137 B2 | 8/2020 | Douglas, Jr. |
| 10,743,178 B2 | 8/2020 | Huang |
| 10,768,010 B2 | 9/2020 | Mendla |
| 10,776,842 B2 | 9/2020 | Liu |
| 10,791,422 B2 | 9/2020 | Zheng |
| 10,796,006 B2 | 10/2020 | Roake |
| 10,838,582 B2 | 11/2020 | Kerr |
| 10,885,204 B2 | 1/2021 | Adir |
| 10,885,219 B2 | 1/2021 | Dotan-Cohen |
| 10,904,261 B2 | 1/2021 | Atanda |
| 10,917,743 B2 | 2/2021 | Zheng |
| 10,944,726 B2 | 3/2021 | Bender |
| 2006/0247853 A1* | 11/2006 | Jung .................. G01C 21/3626 701/454 |
| 2007/0182753 A1 | 8/2007 | Isidoro |
| 2008/0132251 A1* | 6/2008 | Altman ............... G06Q 30/0268 455/457 |
| 2012/0219236 A1 | 8/2012 | Ali |
| 2014/0375678 A1 | 12/2014 | Kjeldergaard |
| 2019/0164354 A1 | 5/2019 | Sasaki |

FOREIGN PATENT DOCUMENTS

| | | |
|---|---|---|
| WO | 2015002987 | 1/2015 |
| WO | 2015082003 | 6/2015 |
| WO | 2016032713 | 3/2016 |
| WO | 2020131703 | 6/2020 |

\* cited by examiner

SYSTEM AND METHOD FOR GENERATING AMORPHOUS DYNAMIC DISPLAY ICONS

CROSS-REFERENCES TO RELATED APPLICATIONS

The present application is a continuation of U.S. patent application Ser. No. 17/039,959, filed on Sep. 30, 2020, and entitled "System and Method for Generating Dynamic Display Icons" (issued as U.S. Pat. No. 11,337,177 on May 17, 2022), which claims the benefit of priority under 35 U.S.C. § 119(e) from U.S. Provisional Application Ser. No. 63/082,361 filed on Sep. 23, 2020 and entitled "System and Method for Generating Dynamic Display Icons," the entire contents of which are hereby incorporated by reference into this disclosure as if set forth fully herein.

BACKGROUND OF THE INVENTION

I. Field of the Invention

The field of the invention generally relates to geolocation data being represented by an icon on a geographical mapping interface and, in particular, to the visual communication of obfuscated geolocation data by a continuously generated amorphous and/or asymmetrical mapping display icon.

II. Discussion of the Prior Art

Location geographic data (or geolocation data) of users and/or entities is an area of technology that is continuing to grow in size and dimension across data systems and devices worldwide. As a result, the need to exchange, transfer, and or share this data is equally expanding due to social and or business demands. The use of global positioning system (GPS) enabled devices has made geolocation easy, useful, and nearly ubiquitous. Among its uses is the ability for a user to pinpoint his or her location on a graphical mapping interface (GMI) of choice (e.g., Apple Maps, Google Maps, Yelp, or any other application having a GMI component), or find directions to a known address. The GPS technology not only allows a user to know his/her own location, but also may effectively broadcast that location to anyone with the ability to receive it.

However, there are many instances in which a person or entity may not want to broadcast its precise GPS location. For example, the sharing of precise location data is not a requirement for many business and/or social situations. Additionally, the practice may pose many undue risks to individuals. For example, many people around the globe carry GPS-enabled devices (e.g., smart phone, smart watch, tablet computer, etc.) on their person daily. Having precise location data broadcast to anyone who wants it can be very unsettling, if not downright dangerous. Attempts have been made in the art to solve this problem via cloaking, blurring, and or obfuscation systems and or methods.

Without exception, these attempts have focused primarily on randomization algorithms of the broadcast location data directly. For example, these systems and or methods proceed to ultimately deliver the data for viewing by third parties by way of an off-set, blurred or oversized display icon on a graphical mapping interface, which essentially displays a false location to the user, without indicating it is a false location (blurring notwithstanding). However, humans often inbound information more rapidly through graphic shapes and or images, which is the reason GMI's are more useful than data alone. Thus, the viewer of the obfuscated location data may erroneously believe the sender's location to be in a certain place when the sender is in fact not there. In many instances this is either harmless or even the intended result, however it is not without its own danger (e.g. a person lost or separated from another individual or group and without communication ability being unable to locate the other member(s) of their party).

While these approaches do mitigate the risks associated with sharing precise location data (e.g., by displaying a false location), they fail to intuitively and or visually communicate to its audience that geo-location cloaking or obfuscation techniques are in use on its subjects. Off-setting or oversizing icons do not visually communicate to the viewer that the subject is not in the center because it is standard practice to do so; moreover, presenting something as unclear and or not sharply defined "blurring" suffers from same problem but now introduces eye strain.

There is a need in the art for a dynamic display icon that is clearly defined in shape and or shape boundaries and opacity clarity but randomly and continuously transforms in shape, size, dimension, and/or symmetry, which may visually reflect the behavior and/or nature of geo-location cloaking and/or obfuscation so that its audience (e.g. a user) can visually understand what is taking place. Visual communication can be clear, even when the subject's location does not need to be.

SUMMARY OF THE INVENTION

Disclosed herein are systems and methods for generating randomized and/or fuzzy logic dynamic display icons that visually communicate to users and/or entities that a subject's geographic location is being obfuscated on a graphical mapping interface on the user's computing device (e.g., desktop computer, laptop computer, smart phone, tablet computer, and the like) by way of amorphous and/or asymmetrical shape, size, position, color, opacity, outline, movement, and/or transformation rate. For example, implementations of the disclosed methods and systems are envisioned to receive a subject's obfuscated location coordinates, render a dynamic icon having an amorphous and/or asymmetrical shape, size, position, color, opacity, outline, movement, and/or transformation rate, and display the rendered dynamic icon on a graphical mapping interface (GMI) on the user's computing device.

By way of example, the system may include an icon-generating software application ("app") that is operable to utilize features of the computing device, such as a GMI, display screen, etc., to clearly indicate to a user that the subject's geolocation is obfuscated, e.g., by overlaying a new, dynamic location icon rendered by the app onto a GMI interface currently in use by the user (e.g., Apple Maps, Google Maps, Yelp, etc.).

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The system and method for generating dynamic display icons disclosed herein boasts a variety of inventive features and components that warrant patent protection, both individually and in combination.

Disclosed herein are systems and methods for generating randomized and/or fuzzy logic dynamic display icons which visually communicate to its users and/or entities that a subject's geographic location is being obfuscated on a graphical mapping interface on the user's computing device (e.g. desktop computer, laptop computer, smart phone, tablet computer, and the like) by way of amorphous and/or asymmetrical shape, size, position, color, opacity, outline, movement, and/or transformation rate. For example, implementations of the disclosed methods and systems are envisioned to receive a subject's obfuscated location coordinates, render a dynamic icon having an amorphous and/or asymmetrical shape, size, position, color, opacity, outline, movement, and/or transformation rate, and display the rendered dynamic icon on a graphical mapping interface (GMI) on the user's computing device.

By way of example, the system may include an icon generating software application ("app") that is operable to utilize features of the computing device, such as a GMI, display screen, etc., to clearly indicate to a user that the subject's geolocation is obfuscated, e.g., by overlaying a new, continuously-generated, dynamic, amorphous and/or asymmetrical location icon rendered by the app onto a GMI interface currently in use by the user (e.g. Apple Maps, Google Maps, Yelp, etc.).

Figure 1:
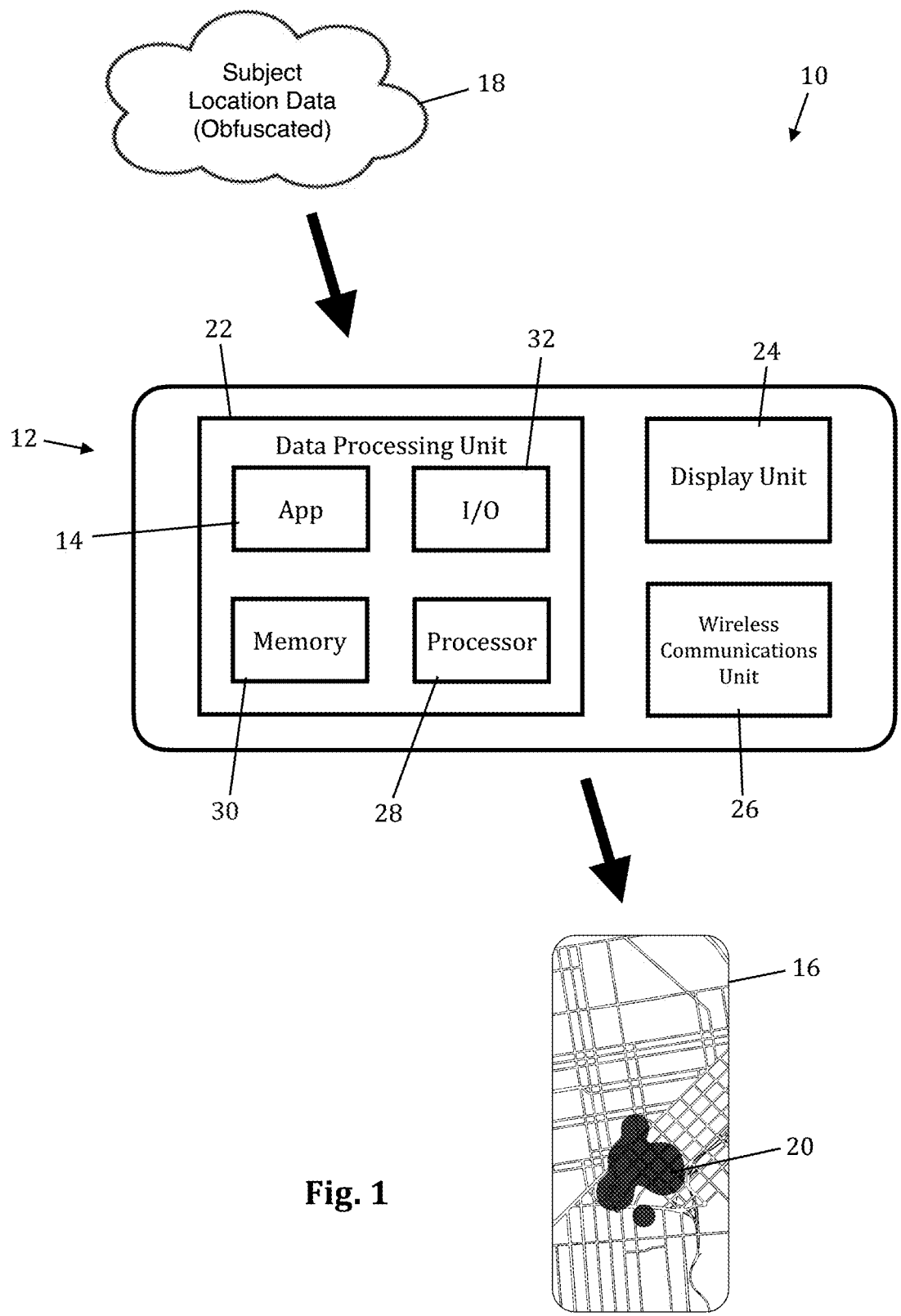
FIG. 1 is a block diagram of an example of an icon rendering system according to one aspect of the disclosure, including a computing device, software application, and graphical mapping display interface on which a user and/or entity may view obfuscated locations, according to some embodiments.

By way of example only, FIG. 1 illustrates an example of an icon rendering system 10 according to one aspect of the disclosure, including a computing device 12, software application 14, and graphical mapping display interface (GMI) 16 that a user and or entity may view obfuscation locations, according to some embodiments. Generally, a subject's (or sender's) obfuscated location data 18 is received by the computing device 12 and recognized by the computing device 12 as being obfuscated. The computing device 12 may then utilize the icon rendering software app 14 to create (and continuously generate) an amorphous and/or asymmetric dynamic icon 20, which is displayed on the GMI interface 16 to clearly indicate to the user the obfuscated general location of the subject.

By way of example only, the computing device 12 of the icon rendering system 10 includes a data processing unit 22, a display unit 24, and a wireless communications unit 26. The data processing unit 22 of the computing device 12 includes a processor 28 to process data, a memory unit 30 in communication with the processor 28 to store data, and an input/output unit (I/O) 32 to interface the processor 28 and/or memory 30 to other modules, units or devices of the computing device 12 or external devices. For example, the processor 28 can include a central processing unit (CPU) or a microcontroller unit (MCU). For example, the memory 30 can include and store processor-executable code, which when executed by the processor 28, configures the data processing unit 22 to perform various operations, e.g., such as receiving information, commands, and/or data, processing information and data, transmitting or providing information/data to another device, rendering a dynamic display icon 20, and displaying the rendered dynamic display icon 20 on a GMI 16. In some implementations, the data processing unit 22 can transmit raw or processed data to a computer system or communication network accessible via the Internet (referred to as 'the cloud') that includes one or more remote computational processing devices (e.g., servers in the cloud). To support various functions of the data processing unit, the memory 30 can store information and data, such as instructions, software, values, images, and other data processed or referenced by the processor 28. For example, various types of Random Access Memory (RAM) devices, Read Only Memory (ROM) devices, Flash Memory devices, and other suitable storage media can be used to implement storage functions of the memory unit 30. The I/O 32 of the data processing unit 22 can interface the data processing unit 22 with the wireless communications unit 26 to utilize various types of wired or wireless interfaces compatible with typical data communication standards, for example, which can be used in communications of the data processing unit 22 with other devices via a wireless transmitter/receiver (Tx/Rx) unit, e.g., including, but not limited to, Bluetooth, Bluetooth low energy, Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE cellular communication methods, NFC (Near Field Communication), and parallel interfaces. The I/O 32 of the data processing unit 22 can also interface with other external interfaces, sources of data storage, and/or visual or audio display devices, etc. to retrieve and transfer data and information that can be processed by the processor 28, stored in the memory unit 30, or exhibited on an output unit of the computing device 12 or an external device. For example, a display unit 24 of the computing device 12 can be configured to be in data communication with the data processing unit 22, e.g., via the I/O 32, to provide a visual display, an audio display, and/or other sensory display that produces the user interface (e.g., the GMI 16) of the icon rendering app 14. In some examples, the display unit 24 can include various types of screen displays, speakers, or printing interfaces, e.g., including but not limited to, light emitting diode (LED), or liquid crystal display (LCD) monitor or screen, cathode ray tube (CRT) as a visual display; audio signal transducer apparatuses as an audio display; and/or toner, liquid inkjet, solid ink, dye sublimation, inkless (e.g., such as thermal or UV) printing apparatuses, etc.

Figure 2:
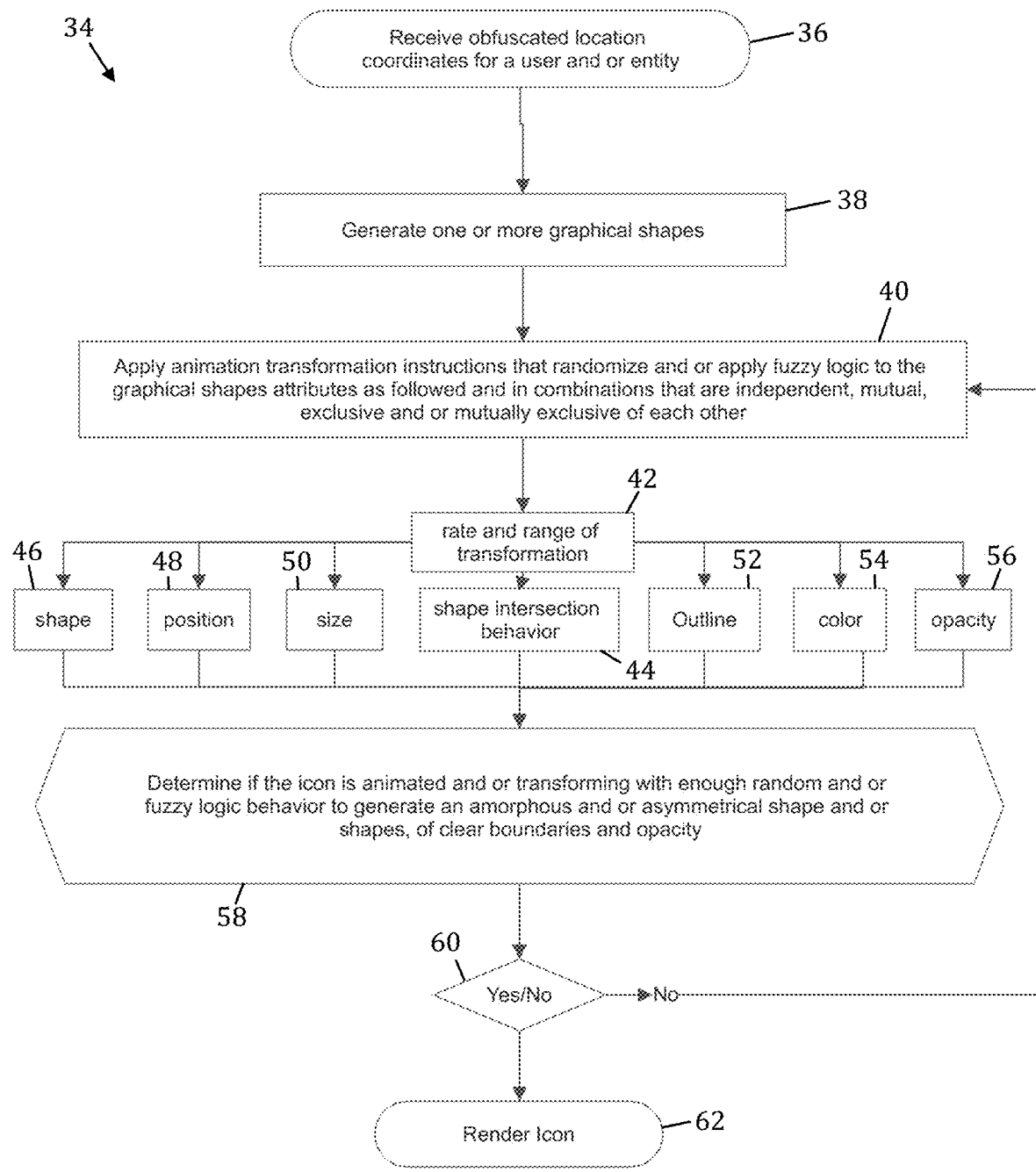
FIG. 2 is a flow chart illustrating an example process for reporting location information, according to some embodiments.

FIG. 2 illustrates an exemplary method 34 of rendering a dynamic display icon 20 to visually communicate to the user of the subject's obfuscated location data, according to some embodiments. In some embodiments, the first step 36 of the method 34 is to receive (e.g., via the wireless communications unit 26 of the computing device 12, through the network 64 of FIG. 3) the obfuscated location coordinates for a subject (e.g., individual or entity). The data processing unit 22 may then analyze the location coordinates and recognize that the coordinates are obfuscated. The data processing unit 22 then proceeds to the next step 38 of the method 34, which is to generate one or more graphical shapes (e.g., circles, squares, triangles, or any other suitable polygon).

In the next step 40 of the method 34, the data processing unit 22 may apply animation transformation instructions that, when executed by the processor 28, randomize and/or apply fuzzy logic to various attributes of the graphical shapes generated in the previous step 38, the rate and range of transformation 42 of the various attributes, and the shape intersection behavior 44 (e.g., how the shapes move relative to one another). By way of example, the various attributes of the graphical shapes that are randomized include but are not limited to shape 46, position 48, size 50, outline 52, color 54, and opacity 56. These attributes may be randomized in combinations that are independent, mutual, exclusive, and/or mutually exclusive of one another.

In some embodiments, after applying the animation transformation instructions of the previous step, the data processing unit 22 may then proceed to the next step 58 of the method 34, which is to determine if the icon is dynamic and/or transforming with enough random and/or fuzzy logic behavior to generate an amorphous and/or asymmetrical shape or shapes, of clear boundaries and opacity. It should be noted that the dynamic icons 20 generated by a preferred embodiment of the method 34 disclosed herein have clear, continuously moving boundaries, however in some embodiments of the method 34, the dynamic icons 20 may have continuously moving boundaries that are less clear, blurry, fuzzy, etc.

If the data processing unit 22 determines that the icon is dynamic and/or transforming with enough random and/or fuzzy logic behavior, then the computing device 12 will proceed to the final step 62 of the method 34, which is to render the dynamic icon 20 and apply the rendered dynamic icon 20 as an overlay on various GMI that the user may be using. If the data processing unit 22 determines that the rendered dynamic icon 20 is not dynamic and/or transforming with enough random and/or fuzzy logic behavior, then the computing device 12 will revert back to the third step 40 of the method 34, which is to reapply the animation transformation instructions, and proceed though the method 34 as described above.

Figure 3:
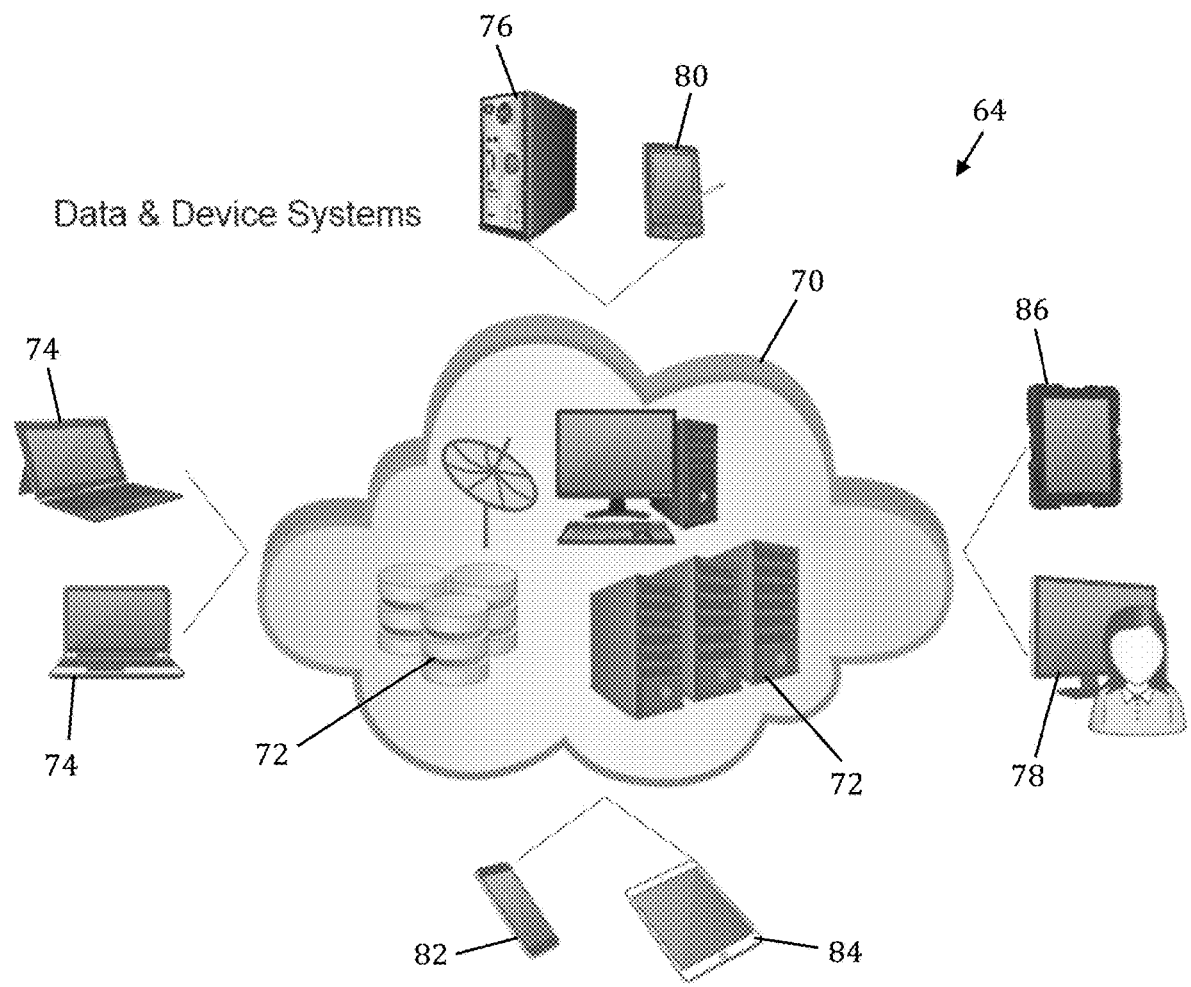
FIG. 3 is a block diagram illustrating an example network environment in which location coordinates may be provided for an entity, according to some embodiments.
Figure 4:
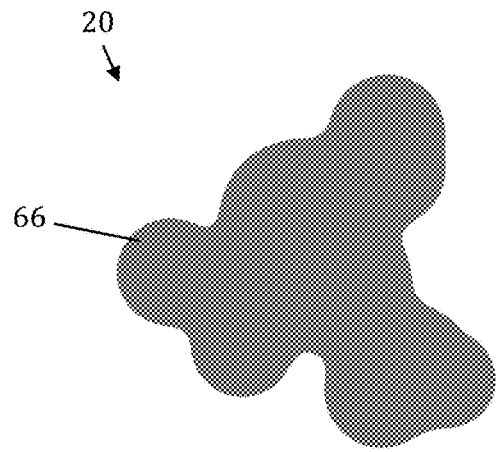
FIG. 4 is a diagram illustrating an example of a dynamic amorphous and/or asymmetrical shape, according to some embodiments.
Figure 5:
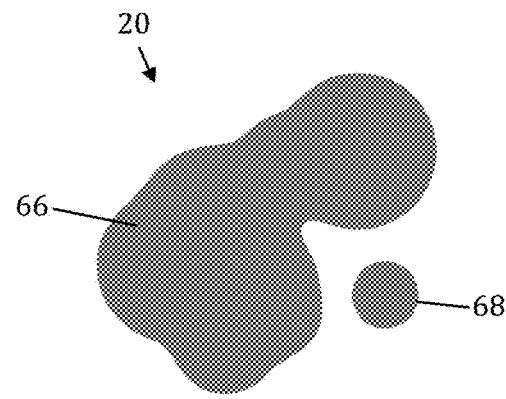
FIG. 5 is a diagram illustrating another example of a dynamic amorphous and/or asymmetrical shape, according to some embodiments.
Figure 6:
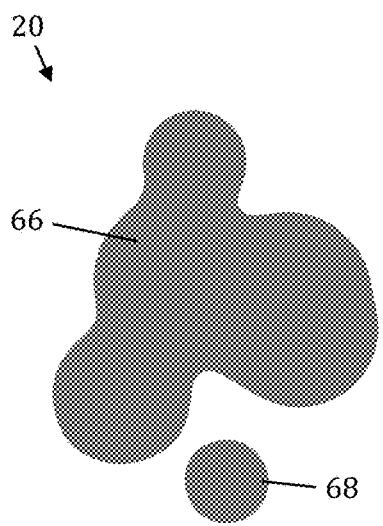
FIG. 6 is a diagram illustrating another example of a dynamic amorphous and/or asymmetrical shape, according to some embodiments.

According to some embodiments, FIG. 3 illustrates an example network 64 environment in which location coordinates may be provided for an entity. For example, a "cloud" environment 70 may be created by one or more network servers 72 in communication with each other to transmit data around the globe. Various end-user computing devices, including laptop computers 74, desktop computers 76, workstations 78, personal digital assistants 80, smart phones 82, tablet computers 84, and/or other GPS and network-enabled devices 86 are also in communication with the cloud and each other. Through this system (or something similar), geolocation data may be transmitted from a subject sender's device to a user receiver's device.

Figure 7:
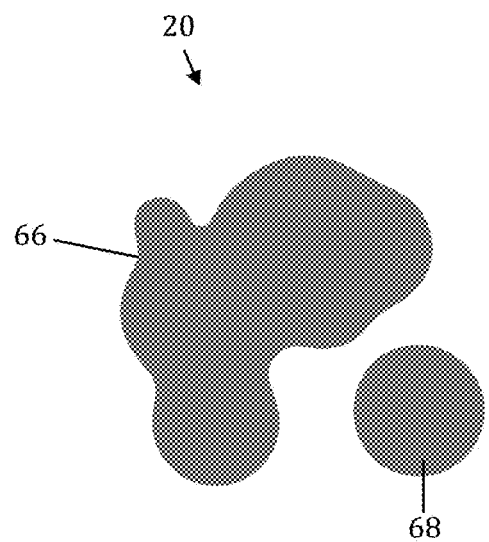
FIG. 7 is a diagram illustrating another example of a dynamic amorphous and/or asymmetrical shape, according to some embodiments.

According to some embodiments, FIGS. 4-7 illustrate several examples of an amorphous and/or asymmetrical shape that may be generated by the icon rendering app 14 during continuous generation of the dynamic icon 20, using the exemplary method described above. In some embodiments, as illustrated by way of example in FIG. 4, the icon rendering app 14 may cause the generation of a plurality of graphical shapes that overlap or intersect one another to form a larger amorphous and/or asymmetrical shape 66 having a continuous outer boundary. In some embodiments, as illustrated by way of example in FIGS. 5-7, one or more of the generated graphical shapes may be separated from the larger amorphous and/or asymmetrical shape 66 and form a standalone shape 68, for example in various sizes such as small (FIG. 5), medium (FIG. 6), and large (FIG. 7). It is important to note that the figures shown by way of example only represent snapshots of a potential single moment in time of the continuous random generation of the dynamic display icon 20. Thus, in operation the dynamic display icon 20 may visually morph between forms (e.g. single large amorphous and/or asymmetrical shape and large amorphous and/or asymmetrical shape with one or more associated standalone shapes) that are presented to the user continuously and at random. In each instance, the dynamic display icon 20 of the preferred embodiment in any form has a clear boundary (or boundaries, in the case of an amorphous shape with one or more associated standalone shapes) and opacity, although the location of the boundary, and degree of opacity (along with size, shape, position, color, transformation rate, transformation range, and/or shape intersection behavior) may be continuously changing.

Figure 8:
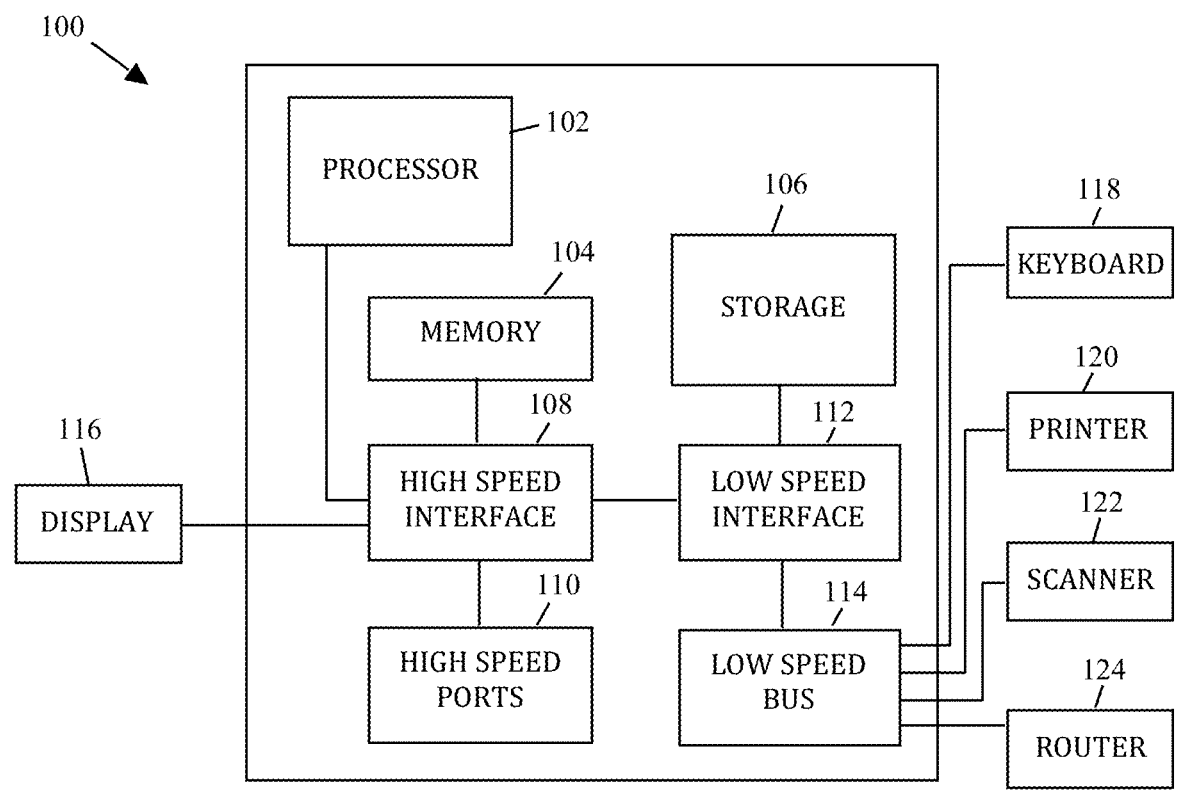
FIGS. 8 and 9 are block diagrams illustrating example computer systems with which any of the devices and/or systems described herein may be implemented, according to some embodiments.
Figure 9:
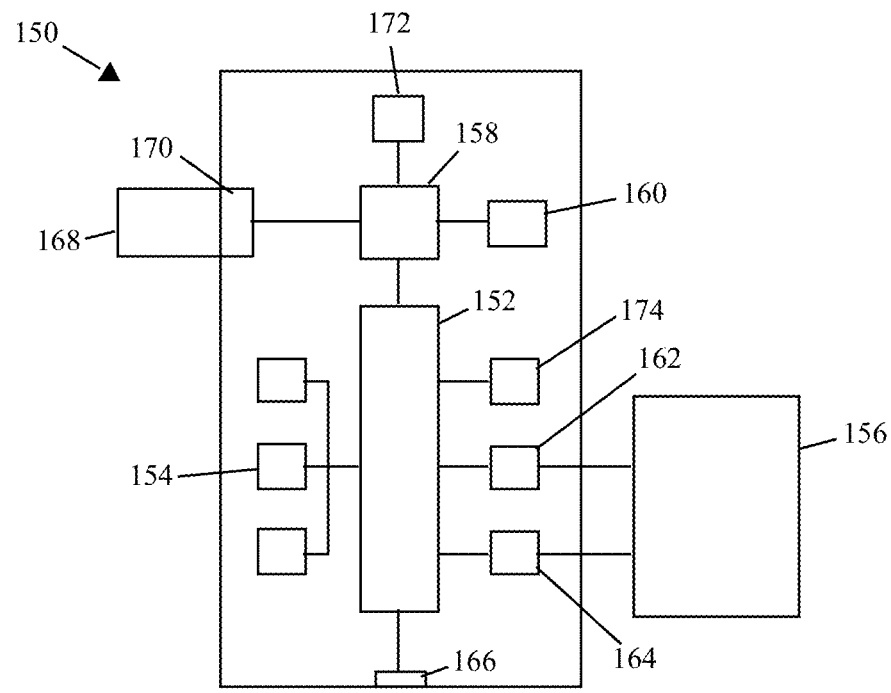

FIGS. 8-9 are example block diagrams of computer-implemented electronic devices 100, 150 that may be used to implement the systems and methods described in this document, as either a client or as a server or plurality of servers. Computing device 100 is intended to represent various forms of digital computers, such as laptops, desktops, workstations, personal digital assistants, servers, blade servers, mainframes, and other appropriate computers. Computing device 150 is intended to represent various forms of mobile devices, such as personal digital assistants, cellular telephones, smart-phones, and other similar computing devices. In this example, computing device 150 may represent a hand-held computing device 12, while computing device 100 may represent a physically larger system such as a stationary computer 12 and/or computing systems that serve as a cloud server. The components shown here, their connections and relationships, and their functions, are meant to be examples only, and are not meant to limit implementations described and/or claimed in this document.

Referring to FIG. 8, computing device 100 includes a processor 102, memory 104, a storage device 106, a high-speed interface 108 connecting to memory 104 and high-speed expansion ports 110, and a low speed interface 112 connecting to low speed bus 114 and storage device 106. Each of the components 102, 104, 106, 108, 110, and 112 are interconnected using various busses, and may be mounted on a common motherboard or in other manners as appropriate. The processor 102 can process instructions for execution within the computing device 100, including instructions stored in the memory 104 or on the storage device 106 to display graphical information for a graphic user interface (GUI) on an external input/output device, such as display 116 coupled to high-speed interface 108. In other implementations, multiple processors and/or multiple buses may be used, as appropriate, along with multiple memories and types of memory. For example, one or more graphics processing units (GPUs) may be used to accelerate the creation of images for display. Also, multiple computing devices 100 may be connected, with each device providing portions of the necessary operations (e.g., as a server bank, a group of blade servers, or a multi-processor system).

The memory 104 stores information within the computing device 100. By way of example only, the memory 104 may be a volatile memory unit, non-volatile memory unit, or another form of computer-readable medium, such as a magnetic or optical disk (for example).

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high-speed interface 108 manages bandwidth-intensive operations for the computing device 100, while the low speed interface 112 manages lower bandwidth-intensive operations. Such allocation of functions is by way of example only. In one implementation, the high-speed interface 108 is coupled to memory 104, display 116 (e.g., through a graphics processor or accelerator), and to high-speed expansion ports 110, which may accept various expansion cards (not shown). In the implementation, low-speed interface 112 is coupled to storage device 106 and low-speed expansion port 114. The low-speed expansion port may include various communication ports (e.g., USB, Bluetooth, Ethernet, wireless Ethernet) and may be coupled to one or more input/output devices, such as a keyboard 118, a printer 120, a scanner 122, or a networking device such as a switch or router 124, e.g., through a network adapter.

The computing device 100 may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device 100 may be combined with other components in a mobile device, such as device 150 (FIG. 9). Each of such devices may contain one or more of computing device 100, 150, and an entire system may be made up of multiple computing devices 100, 150 communicating with each other.

Referring to FIG. 9, computing device 150 includes a processor 152, memory 154, an input/output device such as a display 156, a communication interface 158, and a transceiver 160, among other components. The device 150 may also be provided with a storage device, such as a microdrive or other device, to provide additional storage. The device 150 may further include one or more graphics processing units (GPUs) to accelerate the creation of images for display. Each of the components 150, 152, 154, 156, 158, and 160 are interconnected using various buses, and several of the components may be mounted on a common motherboard or in other manners as appropriate.

The processor 152 can execute instructions within the computing device 150, including instructions stored in the memory 154. The processor may be implemented as a chipset of chips that include separate and multiple analog and digital processors. Additionally, the processor may be implemented using any of a number of architectures.

For example, the processor 152 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 150, such as control of user interfaces, applications run by device 150, and wireless communication by device 150.

The processor 152 may communicate with a user through control interface 162 and display interface 164 coupled to a display 156. The display 156 may be, for example, a TFT (Thin-Film-Transistor Liquid Crystal Display) display or an OLED (Organic Light Emitting Diode) display, or other appropriate display technology. The display interface 164 may comprise appropriate circuitry for driving the display 156 to present graphical and other information to a user. The control interface 162 may receive commands from a user and convert them for submission to the processor 152. In addition, an external interface 166 may be provided in communication with processor 152, so as to enable near area communication of device 150 with other devices. External interface 166 may provide, for example, for wired communication in some implementations, or for wireless communication in other implementations, and multiple interfaces may also be used.

The memory 154 stores information within the computing device 150. The memory 154 can be implemented as one or more of a computer-readable medium or media, a volatile memory unit or units, or a non-volatile memory unit or units. Expansion memory 168 may also be provided and connected to device 150 through expansion interface 170, which may include, for example, a SIMM (Single In Line Memory Module) card interface. Such expansion memory 168 may provide extra storage space for device 150, or may also store applications or other information for device 150. Specifically, expansion memory 168 may include instructions to carry out or supplement the processes described above, and may include secure information also. Thus, for example, expansion memory 168 may be provided as a security module for device 150, and may be programmed with instructions that permit secure use of device 150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, cause performance of one or more methods, such as those described above. The information carrier is a computer- or machine-readable medium, such as the memory 154, expansion memory 168, or memory on processor 152 that may be received, for example, over transceiver 160 or external interface 166.

Device 150 may communicate wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA6000, or GPRS, among others. Such communication may occur, for example, through radio-frequency transceiver 160. In addition, short-range communication may occur, such as using a Bluetooth, WiFi, or other such transceiver (not shown). In addition, GPS (Global Positioning System) receiver module 172 may provide additional navigation- and location-related wireless data to device 150, which may be used as appropriate by applications running on device 150.

Device 150 may also communicate audibly using audio codec 174, which may receive spoken information from a user and convert it to usable digital information. Audio codec 174 may likewise generate audible sound for a user, such as through a speaker, e.g., in a handset of device 150. Such sound may include sound from voice telephone calls, may include recorded sound (e.g., voice messages, music files, etc.) and may also include sound generated by applications operating on device 150.

The computing device 150 may be implemented in a number of different forms, some of which are shown in the figure. For example, it may be implemented as a cellular telephone. It may also be implemented as part of a smart-phone, personal digital assistant, or other similar mobile device.

Additionally computing device 100 or 150 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

As additional disclosure to the embodiments described herein, the present disclosure describes the following embodiments.

Embodiment 1 is a computer program product embodied in a non-transitory computer readable storage medium on a user's computing device and comprising computer instructions for: (a) recognizing geolocation data of a subject received by the user's computing device as obfuscated; (b) generating a dynamic display icon configured to represent the obfuscated geolocation data and visually communicate to the user that the geolocation data is obfuscated; and (c) displaying, on a display unit of the user's computing device, the generated dynamic display icon superimposed on a graphical mapping interface to communicate to the user the obfuscated geolocation of the subject; wherein the dynamic display icon is at least one of amorphous and asymmetrical.

Embodiment 2 is the computer program product of embodiment 1, wherein generating the dynamic display icon comprises: (a) generating at least one graphical shape; (b) applying at least one of randomization and fuzzy logic to at least one attribute of the at least one generated graphical shape to generate a dynamic display icon; (c) determining if the generated dynamic display icon is transforming with enough randomization or fuzzy logic behavior to continuously generate an amorphous and/or asymmetrical shape having a clear boundary and opacity; and (d) upon determination that the generated dynamic display icon is transforming with enough randomization or fuzzy logic behavior to continuously generate an amorphous and/or asymmetrical shape having a clear boundary and opacity, rendering the dynamic display icon for display.

Embodiment 3 is the computer program product of embodiments 1 or 2, wherein the at least one attribute comprises at least one of shape, position, size, outline, color, opacity, transformation rate, transformation range, and shape intersection behavior.

Embodiment 4 is the computer program product of any of embodiments 1 through 3, wherein the step of applying at least one of randomization and fuzzy logic to at least one attribute of the at least one generated graphical shape to generate the dynamic display icon comprises applying at least one of randomization and fuzzy logic to a plurality of attributes of the at least one generated graphical shape to generate a dynamic display icon.

Embodiment 5 is the computer program product of any of embodiments 1 through 4, wherein the plurality of attributes comprises at least two of shape, position, size, outline, color, opacity, transformation rate, transformation range, and shape intersection behavior.

Embodiment 6 is the computer program product of any of embodiments 1 through 5, wherein the computer program product is embodied in a memory unit of the user's computing device.

Embodiment 7 is the computer program product of any of embodiments 1 through 6, wherein the dynamic display icon is continuously generated.

Embodiment 8 is the computer program product of any of embodiments 1 through 7, wherein the user's computing device comprises a mobile computing device.

Embodiment 9 is the computer program product of any of embodiments 1 through 8, wherein the mobile computing device comprises at least one of a smart phone, tablet computer, and laptop computer.

Embodiment 10 is the computer program product of any of embodiments 1 through 9, wherein the subject geolocation data is received by a wireless communication unit of the user's computing device.

Embodiment 11 is the computer program product of any of embodiments 1 through 10, wherein the step of generating at least one graphical shape comprises generating a plurality of graphical shapes.

Embodiment 12 is the computer program product of any of embodiments 1 through 11, wherein at least a portion of the generated plurality of graphical shapes intersect one another to form a larger amorphous and/or asymmetrical shape.

Embodiment 13 is the computer program product of any of embodiments 1 through 12, wherein the amorphous and/or asymmetrical shape has a continuous outer boundary.

Embodiment 14 is the computer program product of any of embodiments 1 through 13, wherein at least a portion of the generated plurality of graphical shapes is separate from the larger amorphous and/or asymmetrical shape.

Embodiment 15 is a method for generating a dynamic display icon for use with a graphical mapping interface, comprising: (a) recognizing received geolocation data of a subject as obfuscated; (b) generating a dynamic display icon configured to represent the obfuscated geolocation data and visually communicate to a user that the geolocation data is obfuscated; and (c) displaying, on a display device, the generated dynamic display icon superimposed on a graphical mapping interface to communicate to the user the obfuscated geolocation of the subject; wherein the dynamic display icon is at least one of amorphous and asymmetrical.

Embodiment 16 is the method of embodiment 15, wherein generating the dynamic display icon comprises: (a) generating at least one graphical shape; (b) applying at least one of randomization and fuzzy logic to at least one attribute of the at least one generated graphical shape to generate the dynamic display icon; (c) determining if the generated dynamic display icon is transforming with enough randomization or fuzzy logic behavior to continuously generate an amorphous and/or asymmetrical shape having a clear boundary and opacity; and (d) upon determination that the generated dynamic display icon is transforming with enough randomization or fuzzy logic behavior to continuously generate an amorphous and/or asymmetrical shape having a clear boundary and opacity, rendering the dynamic display icon for display.

Embodiment 17 is the method of embodiments 15 or 16, wherein the at least one attribute comprises at least one of shape, position, size, outline, color, opacity, transformation rate, transformation range, and shape intersection behavior.

Embodiment 18 is the method of any of embodiments 15 through 17, wherein the step of applying at least one of randomization and fuzzy logic to at least one attribute of the at least one generated graphical shape to generate the dynamic display icon comprises applying at least one of randomization and fuzzy logic to a plurality of attributes of the at least one generated graphical shape to generate the dynamic display icon.

Embodiment 19 is the method of any of embodiments 15 through 18, wherein the plurality of attributes comprises at least two of shape, position, size, outline, color, opacity, transformation rate, transformation range, and shape intersection behavior.

Embodiment 20 is the method of any of embodiments 15 through 19, wherein the dynamic display icon is continuously generated.

Embodiment 21 is the method of any of embodiments 15 through 20, wherein the display device comprises a mobile communications device.

Embodiment 22 is the method of any of embodiments 15 through 21, wherein the mobile communications device comprises at least one of a smart phone, tablet computer, and laptop computer.

Embodiment 23 is the method of any of embodiments 15 through 22, wherein the subject geolocation data is received by a wireless communication unit of the display device.

Embodiment 24 is the method of any of embodiments 15 through 23, wherein the step of generating at least one graphical shape comprises generating a plurality of graphical shapes.

Embodiment 25 is the method of any of embodiments 15 through 24, wherein at least a portion of the generated plurality of graphical shapes intersect one another to form a larger amorphous and/or asymmetrical shape.

Embodiment 26 is the method of any of embodiments 15 through 25, wherein the amorphous shape and/or asymmetrical has a continuous outer boundary.

Embodiment 27 is the method of any of embodiments 15 through 26, wherein at least a portion of the generated plurality of graphical shapes is separate from the larger amorphous and/or asymmetrical shape.

Any of the features or attributes of the above-described embodiments and variations can be used in combination with any of the other features and attributes of the above-described embodiments and variations as desired.

From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A computer program product of, embodied in a non-transitory computer readable storage medium on a user's computing device and comprising computer instructions for:
   receiving obfuscated geolocation data of a sender;
   recognizing the received geolocation data of the sender as obfuscated;
   generating a dynamic display icon configured to represent the received obfuscated geolocation data and visually communicate to the user that the received obfuscated geolocation data is obfuscated; and
   displaying, on a display unit of the user's computing device, the generated dynamic display icon superimposed on a graphical mapping interface to visually communicate to the user:
      (1) the received obfuscated geolocation data of the sender; and
      (2) that the received obfuscated geolocation data of the sender is obfuscated;
   wherein the dynamic display icon is at least one of amorphous and asymmetrical; and
   wherein generating the dynamic display icon comprises:
      generating at least one graphical shape;
      applying at least one of randomization and fuzzy logic to at least one attribute of the at least one generated graphical shape to generate the dynamic display icon;
      determining if the generated dynamic display icon is transforming with enough randomization or fuzzy logic behavior to continuously generate an amorphous or asymmetrical shape having a clear boundary and opacity; and
      upon determination that the generated dynamic display icon is transforming with enough randomization or fuzzy logic behavior to continuously generate an amorphous or asymmetrical shape having a clear boundary and opacity, rendering the dynamic display icon for display.

2. The computer program product of claim 1, wherein the at least one attribute comprises at least one of shape, position, size, outline, color, opacity, transformation rate, transformation range, and shape intersection behavior.

3. The computer program product of claim 1, wherein the step of applying at least one of randomization and fuzzy logic to at least one attribute of the at least one generated graphical shape to generate the dynamic display icon comprises applying at least one of randomization and fuzzy logic to a plurality of attributes of the at least one generated graphical shape to generate a dynamic display icon.

4. The computer program product of claim 3, wherein the plurality of attributes comprises at least two of shape, position, size, outline, color, opacity, transformation rate, transformation range, and shape intersection behavior.

5. The computer program product of claim 1, wherein the computer program product is embodied in a memory unit of the user's computing device.

6. The computer program product of claim 1, wherein the dynamic display icon is continuously generated.

7. The computer program product of claim 1, wherein the user's computing device comprises a mobile computing device.

8. The computer program product of claim 7, wherein the mobile computing device comprises at least one of a smart phone, tablet computer, and laptop computer.

9. The computer program product of claim 1, wherein the obfuscated geolocation data of the sender is received by a wireless communication unit of the user's computing device.

10. The computer program product of claim 1, wherein the step of generating at least one graphical shape comprises generating a plurality of graphical shapes.

11. The computer program product of claim 10, wherein at least a portion of the generated plurality of graphical shapes intersect one another to form a larger amorphous or asymmetrical shape.

12. The computer program product of claim 11, wherein the amorphous or asymmetrical shape has a continuous outer boundary.

13. The computer program product of claim 10, wherein at least a portion of the generated plurality of graphical shapes is separate from the larger amorphous or asymmetrical shape.

14. A method for generating a dynamic display icon for use with a graphical mapping interface, comprising:
   receiving obfuscated geolocation data of a sender;
   recognizing the received obfuscated geolocation data of the sender as obfuscated;
   generating a dynamic display icon configured to represent the received obfuscated geolocation data and visually communicate to a user that the received obfuscated geolocation data is obfuscated; and
   displaying, on a display device, the generated dynamic display icon superimposed on a graphical mapping interface to visually communicate to the user:
      (1) the received obfuscated geolocation data of the sender; and
      (2) that the received obfuscated geolocation data of the sender is obfuscated;
   wherein the dynamic display icon is at least one of amorphous and asymmetrical; and
   wherein generating the dynamic display icon comprises:
      generating at least one graphical shape;
      applying at least one of randomization and fuzzy logic to at least one attribute of the at least one generated graphical shape to generate the dynamic display icon;
      determining if the generated dynamic display icon is transforming with enough randomization or fuzzy logic behavior to continuously generate an amorphous or asymmetrical shape having a clear boundary and opacity; and
      upon determination that the generated dynamic display icon is transforming with enough randomization or fuzzy logic behavior to continuously generate an amorphous or asymmetrical shape having a clear boundary and opacity, rendering the dynamic display icon for display.

15. The method of claim 14, wherein the at least one attribute comprises at least one of shape, position, size, outline, color, opacity, transformation rate, transformation range, and shape intersection behavior.

16. The method of claim 14, wherein the step of applying at least one of randomization and fuzzy logic to at least one attribute of the at least one generated graphical shape to generate the dynamic display icon comprises applying at least one of randomization and fuzzy logic to a plurality of attributes of the at least one generated graphical shape to generate the dynamic display icon.

17. The method of claim 16, wherein the plurality of attributes comprises at least two of shape, position, size, outline, color, opacity, transformation rate, transformation range, and shape intersection behavior.

18. The method of claim 17, wherein the dynamic display icon is continuously generated.

* * * * *